(12) United States Patent
Quinones

(10) Patent No.: US 9,393,556 B2
(45) Date of Patent: Jul. 19, 2016

(54) PROCESS TO IMPROVE FORMULATIONS OF HYDROCARBON CONVERSION CATALYSTS THROUGH REMOVAL AND MODIFICATION OF DETRIMENTAL PARTICLES AND REUSE OF MODIFIED FRACTIONS

(75) Inventor: Augusto Rodolfo Quinones, Houston, TX (US)

(73) Assignee: Quanta Technologies, LLC

( * ) Notice: Subject to any disclaimer, the term of this patent is extended or adjusted under 35 U.S.C. 154(b) by 1019 days.

(21) Appl. No.: 13/422,013

(22) Filed: Mar. 16, 2012

(65) Prior Publication Data

US 2012/0238790 A1     Sep. 20, 2012

Related U.S. Application Data

(60) Provisional application No. 61/465,390, filed on Mar. 19, 2011.

(51) Int. Cl.
| | |
|---|---|
| *B01J 23/02* | (2006.01) |
| *B01J 37/00* | (2006.01) |
| *B01J 29/08* | (2006.01) |
| *B01J 35/02* | (2006.01) |
| *C10G 3/00* | (2006.01) |
| *C10G 11/18* | (2006.01) |
| *C10G 1/08* | (2006.01) |

(52) U.S. Cl.
CPC .......... *B01J 37/0045* (2013.01); *B01J 29/084* (2013.01); *B01J 35/023* (2013.01); *B01J 37/009* (2013.01); *B01J 37/0036* (2013.01); *C10G 1/08* (2013.01); *C10G 3/44* (2013.01); *C10G 11/18* (2013.01); *C10G 2300/1011* (2013.01); *C10G 2300/1044* (2013.01); *C10G 2300/70* (2013.01); *Y02P 30/20* (2015.11)

(58) Field of Classification Search
CPC ....... C10G 3/00; G01N 1/2208; G01N 1/2211
USPC ............. 209/233, 3.1; 208/120, 113; 502/439
See application file for complete search history.

(56) References Cited

U.S. PATENT DOCUMENTS

| | | | |
|---|---|---|---|
| 2,934,494 A | 4/1960 | Kleiber | |
| 3,373,102 A | 3/1968 | Schulman | |
| 3,748,251 A | 7/1973 | Demmel et al. | |
| 4,066,533 A | 1/1978 | Myers et al. | |
| 4,209,273 A | 6/1980 | Lehnen | |
| 4,895,636 A | 1/1990 | Chen et al. | |
| 5,209,840 A | 5/1993 | Sherwood, Jr. et al. | |
| 5,393,412 A * | 2/1995 | Hettinger ................ | 208/120.01 |
| 5,746,321 A * | 5/1998 | Hettinger et al. ............ | 209/233 |
| 5,854,161 A | 12/1998 | Ichiki et al. | |
| 6,800,579 B2 | 10/2004 | Daage et al. | |

(Continued)

OTHER PUBLICATIONS

Translation of State Intellectual Property Office of China, Oct. 26, 2015, Notification of Second Office Action.

(Continued)

*Primary Examiner* — Nina Bhat
(74) *Attorney, Agent, or Firm* — Beck & Thomas, P.C.

(57) ABSTRACT

An improved hydrocarbon conversion catalyst is obtained through removal and modification by various means, of detrimental large and/or small particle fractions. Such modified fractions may be reused in the same or similar processes. The improved catalyst is advantageous to a wide range of hydrocarbon conversion processes.

20 Claims, 7 Drawing Sheets

(56) References Cited

U.S. PATENT DOCUMENTS

| | | | |
|---|---|---|---|
| 7,090,081 B2 | 8/2006 | Vaughn et al. | |
| 7,223,896 B2 * | 5/2007 | Martens et al. | 585/634 |
| 7,431,826 B2 | 10/2008 | Goolsby et al. | |
| 7,459,485 B2 * | 12/2008 | Botes et al. | 518/700 |
| 7,615,172 B2 * | 11/2009 | Palamara et al. | 264/131 |
| 2002/0036157 A1 | 3/2002 | Macedo | |
| 2005/0054516 A1 | 3/2005 | Vaughn et al. | |
| 2006/0030729 A1 | 2/2006 | Fiorentino et al. | |
| 2007/0088187 A1 | 4/2007 | Miller et al. | |
| 2009/0030225 A1 | 1/2009 | Fiorentino et al. | |
| 2009/0069451 A1 | 3/2009 | Demirel et al. | |
| 2011/0224068 A1 | 9/2011 | Habib, Jr. et al. | |

OTHER PUBLICATIONS

Written Opinion of the International Searching Authority for International Application No. PCT/US2012/029341, Sep. 27, 2012.

International Search Report by the International Searching Authority for International Application No. PCT/US2010/035176, Jan. 31, 2011.

Written Opinion of the International Searching Authority for International Application No. PCT/US2010/035176, Feb. 1, 2011.

* cited by examiner ion in the hydrocarbon conversion system. Poor fluidization stemming from a relatively low component of smaller particles can result in reduced catalyst circulation or fluid bed instability.

PROCESS TO IMPROVE FORMULATIONS OF HYDROCARBON CONVERSION CATALYSTS THROUGH REMOVAL AND MODIFICATION OF DETRIMENTAL PARTICLES AND REUSE OF MODIFIED FRACTIONS

CROSS REFERENCE

This application claims the benefit of U.S. Provisional Application No. 61/465,390, filed on Mar. 19, 2011, and entitled CATALYSTS WITH IMPROVED PERFORMANCE VIA REMOVAL AND MODIFICATIONS OF LARGE PARTICLES IN ORIGINAL CATALYST, the entirety of which is incorporated herein by reference.

TECHNICAL FIELD

Hydrocarbon conversion catalysts are improved through the removal of particles above a minimum size threshold and below a maximum size threshold, such that the increased average particle size results in improved accessibility or diffusion in the conversion reactions.

BACKGROUND OF THE INVENTION

The present invention relates generally to hydrocarbon conversion catalysts. Hydrocarbon conversion catalysts are materials that are used to achieve a higher efficiency with respect to the yields and/or the selectivity of chemical reactions conducted to enhance the value of hydrocarbons. An example of the use of such a catalyst is found in the Fluid Catalytic Cracking (FCC) process in petroleum refineries, In the FCC process, a hydrocarbon feedstock with a boiling point usually higher than 650° F. is reacted with a powdered catalyst to produce greater quantities of higher value products that include gasoline, light cycle oil, heavy cycle oil, liquified petroleum gas and other light gases. The catalyst enhances the product yields when compared to a similar reaction without the presence of the catalyst.

The present invention is focused on hydrocarbon conversion catalysts known in the Art as "fluid solid" catalysts and the materials used as components in such catalysts. These catalysts are designed such that even though the catalyst is a solid (solid particles) it behaves like a liquid when enough fluidizing media (e.g. vapors, air) are present. In general, the average particle size of a hydrocarbon conversion catalyst particle is between 60 and 90 microns. Two important parameters of such catalysts are the percent, by weight, of the total particles that have a particle size below 20 microns and the percent by weight of the total below 40 microns.

The first parameter (below 20 microns) is important as an indication of losses or potential losses, as hydrocarbon conversion systems are generally designed with a cutoff in efficiency at around 20 microns, and particles below 20 microns are more difficult to prevent from release to the atmosphere and therefore more likely to present an environmental problem. The losses can be detrimental both economically and environmentally. Cyclonic systems or cyclones and air separators are well known devices used in the Art to separate materials of different physical properties. In particular, cyclones can separate mixtures of solids with different particle size, density, relative mass or any combination thereof. Particles below 20 microns are lost very rapidly from the air cyclone process and either captured by higher efficiency systems downstream or emitted to the atmosphere. The second parameter, the 0-40 micron content, is also significant, as particles in the 20-40 micron range are important for fluidization in the hydrocarbon conversion system. Poor fluidization stemming from a relatively low component of smaller particles can result in reduced catalyst circulation or fluid bed instability.

The chemical nature of hydrocarbon conversion catalysts is well known to those versed in the Art. These catalysts generally contain zeolite Y in one or several forms (RE-Y, USY, RE-USY, CREY, etc) as the main source of activity and selectivity. Some other zeolites like ZSM-5 can be added to change the selectivities both as an intrinsic part of the catalyst or as a separate additive particle. Aluminas or silica aluminas of different properties are sometimes added to increase the activity of the catalyst for conversion of heavy molecules (bottoms upgrading). Clay is used as a filler that assists with the catalyst's chemical and physical properties. A binder, generally a low molecular weight oligomer of silica (Silica Sol), or aluminum chlohydrol (Alumina Sol) is commonly added to the mixture, which is spray dried to form the particles that are shipped for usage, with or without a post-treatment step to adjust the chemical composition and set the desired selectivities. Another type of commercially available hydrocarbon conversion catalyst, the so called "In-Situ" technology, takes preformed spray-dried particles of Kaolin clay and other materials such as silica and aluminas and chemically treats them to form Zeolite Y based hydrocarbon conversion catalysts.

Solid hydrocarbon conversion catalysts are commonly made by spray drying slurries that contain a mixture of the desired components that usually include, as discussed above, the zeolite Y, clay, alumina and a binder which can be based on silica sols, alumina sols or mixtures of both. In one particular technology, a highly peptizable alumina itself becomes the primary binder. In another technology, a particle containing clay treated at specific conditions is formed via spray drying and then is processed to grow zeolite Y. Other components such as silica or alumina, or both, can be added to the clay for specific properties.

Typically, the slurry is spray-dried to give a more or less spherical shaped particle. The particle size distribution of the spray-dried material is a function of the spray drier conditions and the nature and composition of the slurry. In general, the desired properties include: (1) a minimal amount of the 0-20 micron particles, (2) 10-20% of the particles being between 20-40 microns, and (3) an average particle size distribution between 65 microns and 85 microns. In general, hydrocarbon conversion catalysts are made as a continuum of particle sizes and compositions determined by the slurry properties and the spray drier conditions. In some cases, an air classifier is used to remove the smaller particles to meet certain specifications. In general, the 0-40 micron content can be controlled by the use of air classifiers, but this practice is costly, as the efficiency of the classifiers is poor, and valuable catalyst is commonly lost in this practice in order to meet a specification.

The chemical reactions that occur in the hydrocarbon conversion process can be diffusion limited. In general these reactions are defined as reactions in which mass transport of reactants into the catalyst particle limits the reaction efficiency. In commercial processes, many reactions occur, and some may be diffusion limited, while others are not. Another way to define such reactions is that the amount of reaction or the product yields are dependent on the particle size of the solid catalyst. These conditions of "diffusion limitation" are also common to many other catalytic processes. For example, nickel-containing hydrocarbons are very large, and react primarily on the outer-most layers of an FCC catalyst particle. This results in most of the nickel being deposited on the outside of the particle. An analysis of the total external area of the particles as a function of the radius of the particles shows that in such instances, the nickel will be preferentially deposited on the smaller particles due to a larger external area per unit of volume. Among the important hydrocarbon conversion processes that can be diffusion limited, and therefore in which mass transfer is key, are the solid-liquid/solid-solid reactions such as those for Biomass conversion of wood or cellulosic material in contact with a solid catalyst particle. In addition, other reactions in which the contact time is very short tend to also fall in the definition of diffusion limited reactions.

Just as nickel deposition on the hydrocarbon conversion catalyst particle is a function of particle size, many other reactions, some desirable, some undesirable, are dependent on the particle size of the hydrocarbon conversion catalyst.

In general, the catalyst composition of a hydrocarbon conversion catalyst is the same across particle sizes. When mixtures of additives are included, these additives may have a slightly different particle size distribution. However, it is a clear characteristic of hydrocarbon conversion catalysts and additives used to date, to have a continuous, smooth particle size distribution.

While interpreting the terms used to describe the present invention, it is important to consider the different techniques used to measure the particle size distribution of hydrocarbon conversion catalysts. When referring to particle size distribution, this discussion of the present invention refers to the actual physical size as measured by physical methods (like a screen) in which after minimizing agglomeration or attrition, fractions are measured by whether or not particles are able to pass through the screen without major external forces, with the exception of gravity and vibratory motion. In the case of light scattering methodologies, which are well-known to a person in the Art, the particle size distributions are continuous by mathematical manipulations of the experiments. Such continuum is an approximation and it is a limitation of the light scattering technique.

In general terms, the processes and resulting catalyst formulations of the present invention remove two major constraints, thereby enhancing the value of solid hydrocarbon conversion catalysts. Large particles can be detrimental to the processing of the largest molecules in a chemical reaction where a short contact time is required to optimize the reaction. Large molecules cannot effectively transfer to and from the inside of the particle, and the total external surface area of large particles is substantially less than that of a similar amount of catalyst with a smaller particle size. However, removal of large particles results in the concentration of smaller particles. This concentration of smaller particles can be beneficial if the initial content of particles below the minimum optimal threshold is below its optimum. However, a concentration of smaller particles can also be detrimental, if there are too many fine catalyst particles and, as a result, these particles are not properly retained by the hardware. Therefore, the catalyst composition may need to also have smaller particles removed for optimal performance. When the value of the catalyst is considerable, in order to enhance commercial viability, the removed particles may need to be reused in another, or the same, process. Maximum recovery can be achieved if the removed large particles can be reduced in size and if the removed smaller particles are converted into larger particles by re-spray-drying.

Such improvements on the control of particle size are not known in the Art and have not been attempted before. The removal of fine particles by air classification to minimize losses of fine particles is known in the Art. However, unlike the present invention, such practice, which helps to control physical losses from the process, results in catalyst with a much larger concentration of large particles that is often detrimental to the overall catalytic performance of the system. The use of the classified fines as fluidization aids is also known in the Art. However, the process of the present invention that involves the removal and reprocessing of the larger particles of the catalyst system is not known in the Art. On the contrary, although experts in the field acknowledge diffusion limitations, the leading work performed in the Art up to this time has been done under the assumption that the major limitation is at the molecular level, where the pore structure of the catalyst is the limitation. The present invention clearly shows, contrary to the commonly accepted viewpoint, that in many cases, the diffusion limitation is a mass transfer phenomena to and from the catalyst particle. This diffusion limitation is at a micron scale, rather than at the molecular scale commonly assumed in the Art. Molecular considerations imply diffusion limitations at a nanometer or angstrom scale. The present invention clearly demonstrates a previously unknown and unsuspected improvement on yield structure. The focus of the current Art has for decades been on improving a catalyst's pore structure, rather than the improvements on mass transfer phenomena at a much larger scale of the present invention.

SUMMARY OF THE INVENTION

The present invention provides for a method of making a spray-dried catalyst composition for use in any hydrocarbon conversion process. This method includes removing more than 50% of particles above and also more than 50% of particles below a specified threshold and reprocessing the removed particles to reduce particle size for use in the same or a similar process. The spray-dried catalyst composition can be a fresh composition, an equilibrium composition, or a combination of fresh catalyst and equilibrium catalyst.

The particles in the catalyst composition that are larger than the specified threshold can be removed by any practical method, including air classification or screening, or by a combination of air classification and screening. The specified thresholds can be 110 microns, 100 microns, 90 microns, 80 microns, 70 microns, 60 microns, 50 microns, 40 microns, 30 microns, or 20 microns. The hydrocarbon conversion process can depend on particle size for reaction rate or yields.

The present invention also provides for a composite catalyst composition for use in any hydrocarbon conversion process that is dependent on the particle size. The fraction of catalyst above the threshold can be processed by a milling media to reduce its particle size. Of particular usefulness are mills, or media mills, that allow for control of the residence time or contact time between the milling media and the catalyst. In a preferred embodiment of this invention, a dry media mill coupled with an air classifier is used to control the milling severity on the catalyst. Control of the severity is used to minimize the formation of particles below 20 microns. In another embodiment of this invention, the particles that are not used in the catalyst composition, specifically those below 20 microns, are re-formed into larger particles via any compounding/agglomeration technique like spray-drying, extrusion and other common agglomeration method known in the art.

DETAILED DESCRIPTION OF THE INVENTION

Figure 1:
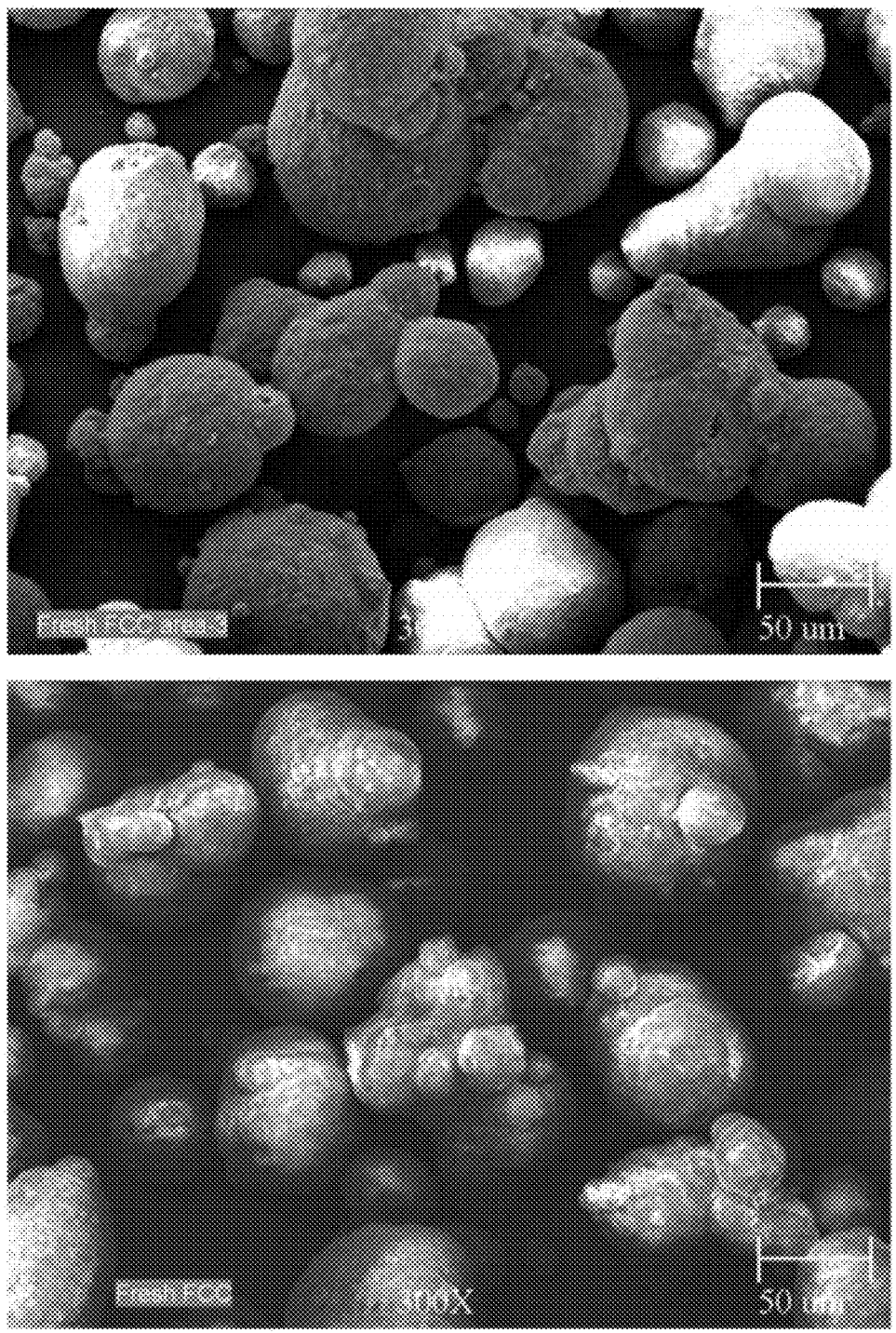
FIG. 1 is a photographic representation of Fresh FCC Catalyst without modification.

Numerous reactions in many industrial processes are dependent on the particle size of the catalyst. Of particular importance for consideration in the present invention are Fluid Catalytic Cracking (FCC), Deep Catalytic Cracking (DCC), BIOMASS Catalytic Conversion, Naptha Cracking to Olefins and other hydrocarbon conversion processes. State of the art catalyst manufacturing techniques for the catalysts used in such hydrocarbon conversion processes that are sensitive to the particle size distribution, do not have a good control on the number of large particles that are formed. Typically, commercial fluid catalysts (commonly made in commercial spray driers) contain somewhere around 20-40% of their weight in the particle size range above 100 microns. This high a percentage of such large particles is disadvantageous to the efficient operation of the process and is therefore not optimum for catalyst composition.

It has been discovered that large catalyst particles are detrimental to diffusion limited reactions. The present invention solves this problem this problem by providing a method to make catalysts with improved performance by removal of the particles above a defined threshold. It has also been shown that although fine particles in the 20-40 micron regime are desirable from a catalytic and fluidization perspective, many commercial reactors do not retain these particles efficiently, and a large percentage of these fine particles are lost from the process, and have to be captured to avoid having such particles released to the environment. Furthermore, downstream units, such as power recovery turbines, are very sensitive to the total amount of catalyst particles impacting them and can be adversely effected when impacted by fine particles that are lost from the process.

When using fresh catalyst, it is not economically viable to reject 20-40% of a product (i.e. the large particles discussed above). The present invention solves this problem through reprocessing of the large particles that reduces the particle size with minimal losses. The applications of these catalyst compositions of the present invention include any hydrocarbon processing that is sensitive to particle size.

The present invention has a very wide range of applicability. The present invention is generally applicable to any and all hydrocarbon conversion processes that are sensitive to particle size, including, but not limited to hydrocarbon conversion processes with catalysts having an optimal average particle size between twenty (20) microns and one hundred (100) microns. These processes include, but are not limited to: Fluid Catalytic Cracking; BIOMASS conversion (especially those starting with solid biomass ground into small particles); Naphtha Cracking to light olefins and Polymerization reactions.

It has been further discovered in the present invention that the catalyst composition may also require the smaller particles to be removed for optimal performance. Particularly when the value of the catalyst is high, in the present invention, to enhance commercial viability, the removed particles may be reused in another or the same process. In the present invention, maximum recovery can be achieved if the removed large particles are reduced in size and the removed smaller particles are converted into larger particles by re-spray-drying.

In a preferred embodiment, of the present invention, a typical fluid hydrocarbon conversion catalyst will be modified as follows:

a) removal of most of the particles above a maximum threshold (usually between 80 and 105 microns) via a physical screening process, air classification or a combination of both, b) removal of most of the particles below a minimum threshold (usually between 20 and 40 microns via a physical screening process, air classification or a combination of both, c) as part of the process, the removed large particles will be reduced in particle size to improve diffusion characteristics while controlling the generation of fines with a size below a defined minimum threshold. The particle size reduction should be a minimum of 10 microns but preferably larger than 30 microns in average, while minimizing the production of fines below the minimum threshold (usually between 20 and 40 microns).

d) as a further part of the process, most of the particles below the minimum threshold resulting from the particle size reduction process as well as those in the original catalyst will be collected and sent for further milling to an average particle size below 10 microns, preferably below 5 microns, where they will be combined with suitable binders and other typical catalytic components for spray-drying.

e) in addition, the milled particles considered suitable for the same process as well as those from the spray-drying of the fines collected may be blended with the original or other similar catalysts for maximum recovery.

Of course, the above description is only one preferred embodiment, and other preferred embodiments of the invention may omit one or more of the process steps listed above.

In another embodiment, the starting material may not be the finished catalyst but instead, an intermediate material. Such would be the case, for example, for hydrocarbon processing catalysts made by the "In-Situ" methodology currently practiced by certain suppliers in the catalyst industry, particularly in Asia. In such a case, under the present invention, the size selection may be done on the microspheres prior to the crystallization and finishing steps. In such a case, where usually inactive microspheres are blended with finished catalyst, it would be of significant commercial value to maximize the content of active particles above the minimum threshold while the particles below the minimum threshold could be inactive clay or a cheaper formulation, inclusive of, but not limited to, ECAT. The following examples demonstrate two applications of the present invention. These examples are illustrative of the present invention, and the present invention is not limited in application to these examples

Example 1

Fresh Catalyst

A fresh catalyst with a typical Particle Size Distribution (PSD) was used as starting material (APS 68 microns). The coarser part of catalyst was then separated using a commercially available screener with a 95 micron screen. This yielded about 35% of the original sample. Prior to screening air classification of fines could be performed to speed up the screening process.

The material retained on the screens was then fed and processed in a media fluid mill containing 5 gallons of (1.8-2.7 mm in diameter) ceramic balls coupled with an air classifier. This system has the option to re-circulate the milled product to control the severity or residence time of the catalyst inside the mill. The higher the re-circulation rate, the slower the milling rate. In one preferred embodiment, the formation of particles smaller than 20 microns is minimized. FIG. 1 shows the starting material prior to any separation.

Example 2

Equilibrium Catalyst

An equilibrium catalyst was screened to remove the coarser fraction using a 95 micron screen. This coarse fraction was then fed into the UFG mill filled with the ceramic media. The product was re-circulated at different rates to change the severity of the milling step. The starting material feed to the mill had an average particle size of 130 microns.

The Table below shows the results of the different experiments as measured by fines generation and average particle size. In order to change the severity, the following parameters were changed:
RPM on the UFG mill changed from 150 to 250 rpm.
Feed rate from 84 lb/hr to 220 lb/hr.

|  | Equilibrium catalyst | | Test 1 | Test 2 | Test 3 | Test 4 | Test 5 | Product |
|---|---|---|---|---|---|---|---|---|
|  | Intial | >95 μm |  |  |  |  |  |  |
| APS, μm | 79 | 130 | 114 | 102 | 40 | 68 | 85 | 73 |
| <20 μm | 0 | 0 | 0 | 1.5 | 25 | 8 | 5 | 2 |
| <40 μm | 6 | 0 | 4 | 14 | 50 | 20 | 13 | 10 |
| <95 μm | 67 | 8 | 28 | 44 | 95 | 80 | 63 | 79 |

Particle sizes in this table are measured by light scattering. As discussed above, these experiments do not reflect the actual size in an absolute manner. These experiments represent valid trends within the limitations of this measurement technique.

Figure 2:
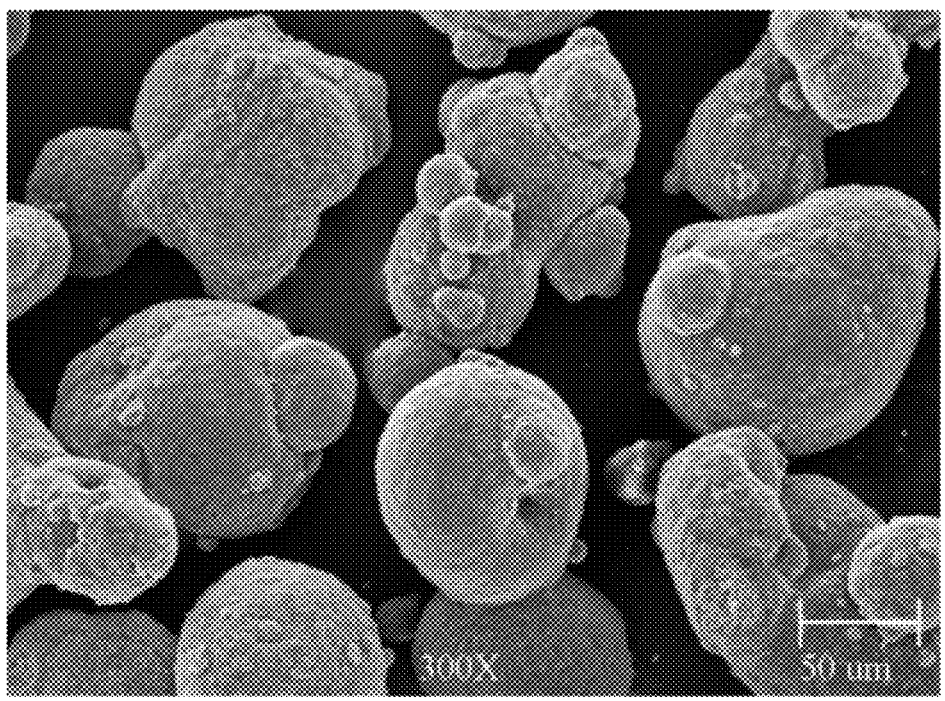
FIG. 2 is a photographic representation of Fresh FCC retained on a 95 micron screen.

As shown in FIG. 1, the starting point for modification by the present invention is a production run of catalyst. After the larger-than-95 micron component is removed by screening, the large particles remain on the screen, as shown in FIG. 2.

Figure 3:
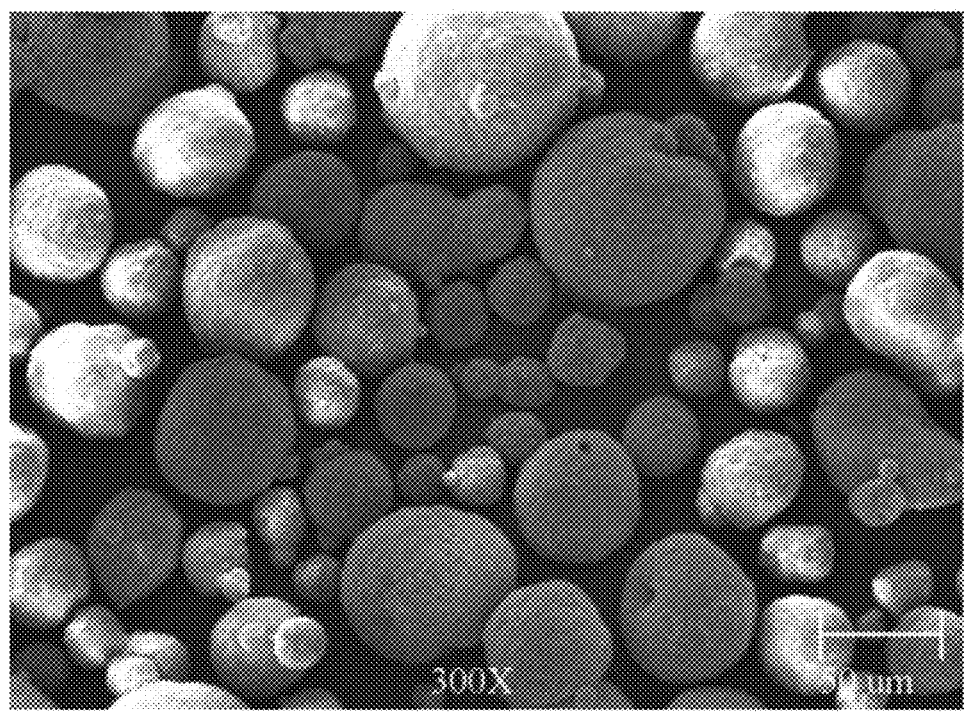
FIG. 3 is a photographic representation of Fresh FCC Catalyst passed through a 95 micron screen without smaller fines.
Figure 4:
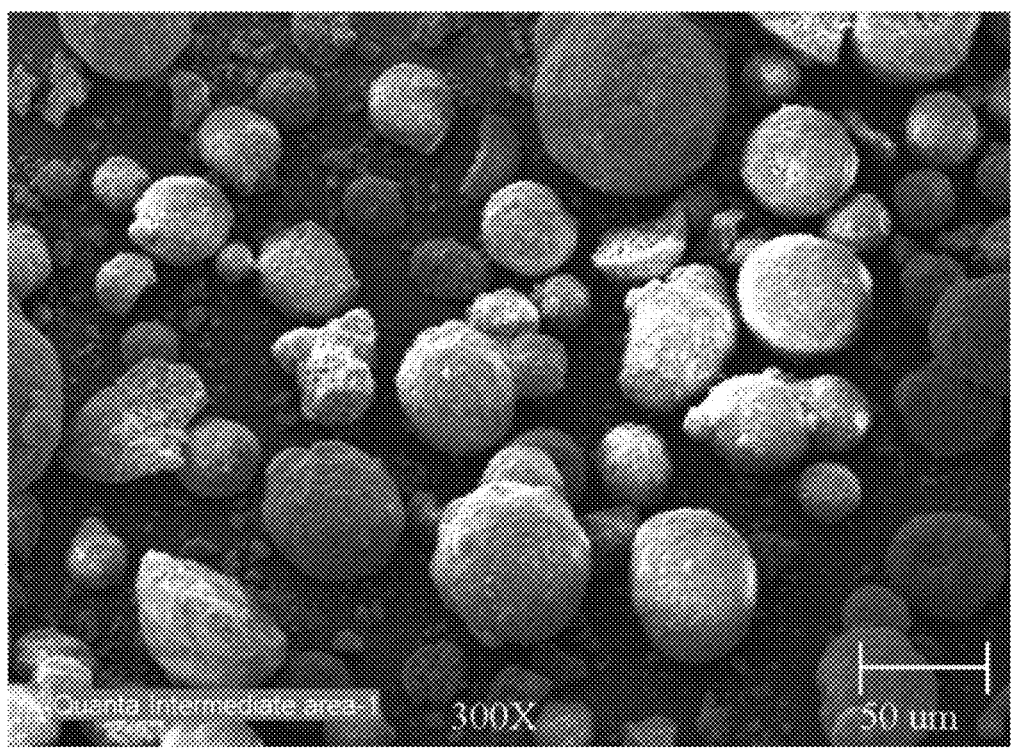
FIG. 4 is a photographic representation of the greater than 95 micron fraction after milling.

The less-than-95 micron component is shown in FIG. 3, after the smaller fines have been removed. After the larger-than-95 micron component is milled the component takes on the appearance shown in FIG. 4.

Figure 5:
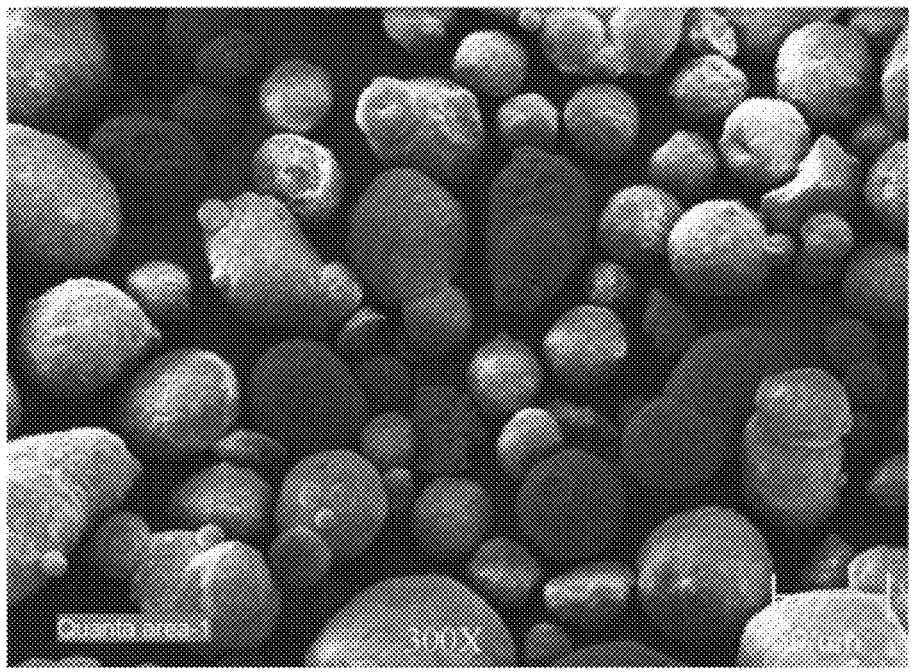
FIG. 5 is a photographic representation of the final FCC Catalyst Product after removal of fines by air classification.
Figure 5:
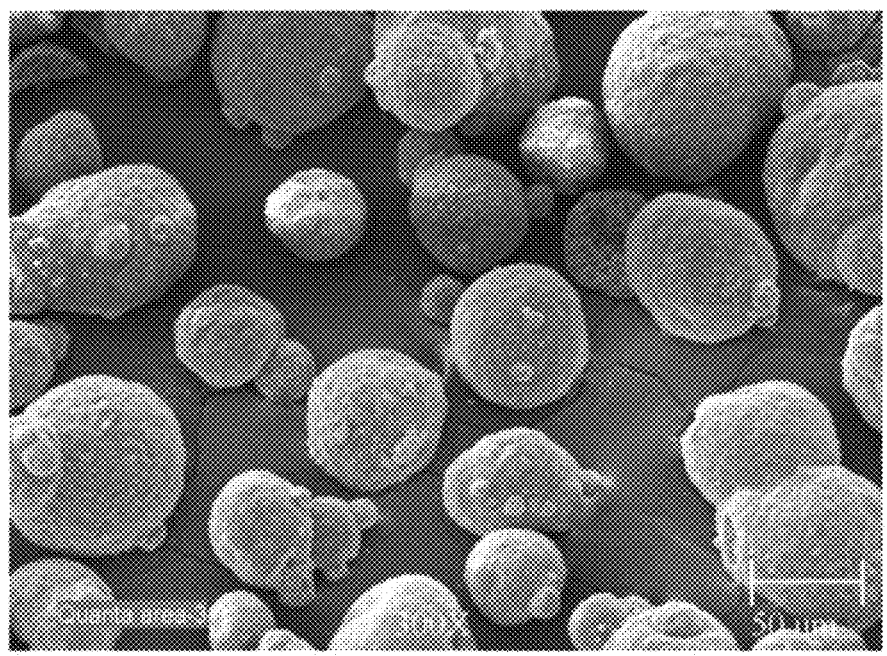
Figure 6:
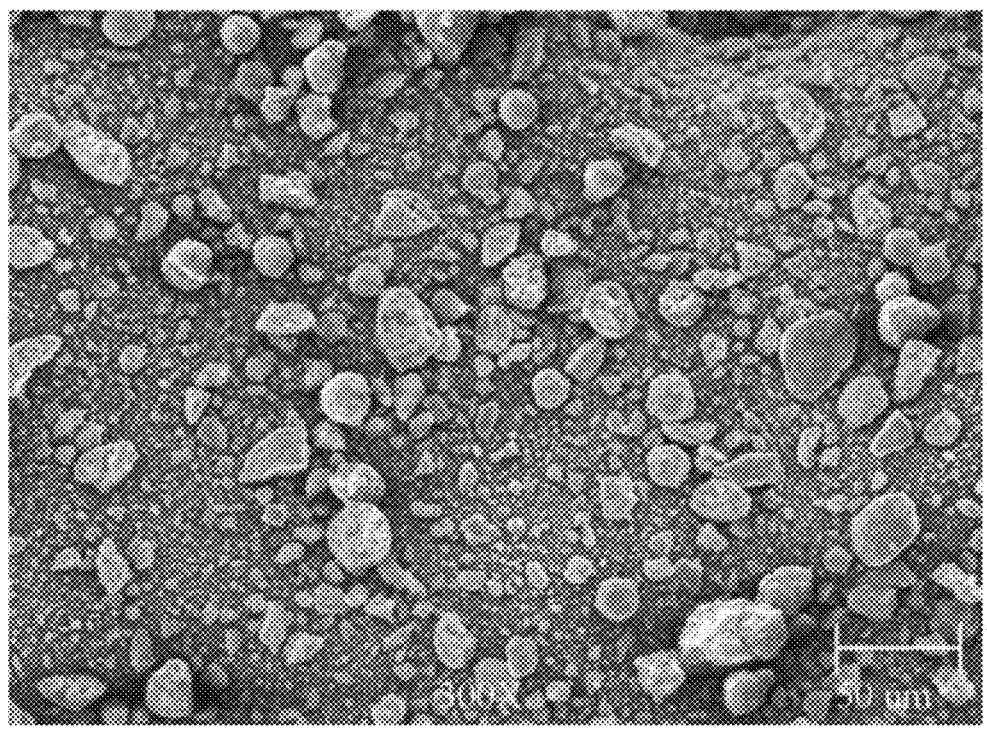
FIG. 6 is a photographic representation of the fines generated by the milling step.

The final product catalyst is shown in FIG. 5, after fines have been removed by air classification. Fines generated by the milling step are shown in FIG. 6.

Figure 7:
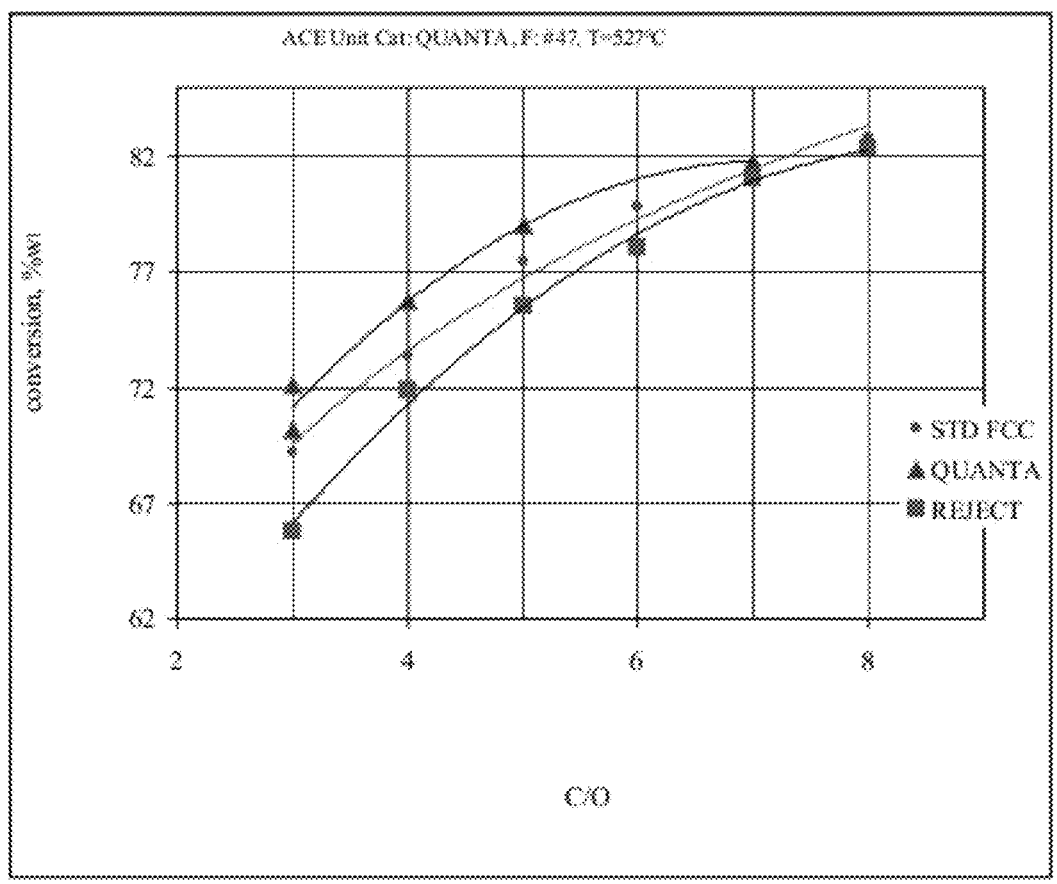
FIG. 7 is a graph showing test results conducted with an ACE unit.

FIG. 7 graphically describes the results of removing the larger-than-95 micron particles from the standard FCC catalyst. Quanta represents the completed catalyst following the application of this one preferred embodiment of the present invention.

In accordance with the Patent Statutes, I have shown and described my invention and claimed what I now consider to be its best embodiments. The invention may be practiced other than as described in the specification so long as it is defined by the enclosed claims.

I claim:

1. A process to make an improved spray-dried fluid hydrocarbon conversion catalyst the improvement comprising: (a) providing spray dried fluid hydrocarbon conversion catalyst particles; (b) removing greater than fifty percent (50%) of particles above 70 microns thereby creating the improved spray-dried fluid hydrocarbon conversion catalyst with improved accessibility or diffusion having less than fifty percent (50%) of the original particles above 70 microns and a catalyst fraction having particles above 70 microns.

2. The process of claim 1 wherein the catalyst fraction is processed so that its average particle size is reduced by at least 10 microns.

3. The process of claim 1, in which the catalyst fraction is processed so that its average particle size is reduced by at least 10 microns, and is re-blended with the improved spray-dried catalyst.

4. The process of claim 2 or 3 where the particle size reduction is done via a milling-type operation.

5. The process of claim 4 where all or part of the milled product is reclassified to remove particles smaller than a minimum value.

6. The process of claim 5 where the fines of the milled product below the minimum value microns are re-milled to less than 10 microns and subsequently combined with other catalyst components to produce spray-dried products of average particle size greater than the minimum value.

7. A process to make an improved spray-dried fluid catalyst by the removal of greater than fifty percent (50%) of particles below a minimum threshold and greater than fifty percent (50%) of particles above a maximum threshold, to create a catalyst with improved diffusion constraint and in which most particles that are insufficiently retained by commercial cyclones have been removed.

8. The process of claim 7 such that the minimum threshold is equal or smaller than 41 microns.

9. The process of claim 7 such that the minimum threshold is equal or smaller than 31 microns.

10. The process of claim 7 such that the minimum threshold is equal or larger than 89 microns.

11. The process of claim 8 in which the fines generated by the particle size reduction process are removed via air classification or screening, or a similar process.

12. The process of claim 11 in which the fines are re-milled in order that they can be re spray-dried into useful product.

13. A process to make an improved catalyst in which the catalyst is split by use of physical screening process.

14. A process to make an improved catalyst in which the catalyst is first separated via air classification and then further separated into one or more fractions via a physical screening process.

15. The process of claim 1, wherein the spray-dried catalyst particles are precursors used to make "In-Situ" hydrocarbon processing catalysts.

16. An improved catalyst composition created by spray-drying a mixture of particles and removing greater than 50% of the particles between 20 and 50 microns and greater than 50% of particles between 70 and 110 microns.

17. The improved catalyst composition of claim 16 to which fines of lesser economic value are added to improve the fluidization characteristics of the formulation.

18. The improved catalyst compositions of claim 16 or 17 in which the minimum threshold is 40 microns and the maximum threshold is 90 microns.

19. The improved catalyst compositions of claim 16 or 17 in which the minimum threshold is 30 microns and the maximum threshold is 90 microns.

20. The improved catalyst compositions of claim 16 or 17 in which the minimum threshold is 30 microns and the maximum threshold is 100 microns.

\* \* \* \* \*